United States Patent [19]

Brooks

[11] 4,183,024
[45] Jan. 8, 1980

[54] SIDE-LOOKING RADAR SYSTEMS
[75] Inventor: Seville R. Brooks, Ongar, England
[73] Assignee: The Marconi Company Limited, Chelmsford, England
[21] Appl. No.: 862,096
[22] Filed: Dec. 19, 1977
[30] Foreign Application Priority Data
  Feb. 16, 1977 [GB] United Kingdom ............... 6555/77
[51] Int. Cl.² .............................................. G01S 9/02
[52] U.S. Cl. ............................. 343/5 ST; 343/5 CM
[58] Field of Search ........................... 343/5 ST, 5 CM
[56] References Cited
  U.S. PATENT DOCUMENTS
  3,228,027  1/1966  Milnes ......................... 343/5 ST X
  3,680,086  7/1972  Valstar ........................ 343/5 ST X
  FOREIGN PATENT DOCUMENTS
  1455871 11/1976 United Kingdom.

Primary Examiner—Maynard R. Wilbur
Assistant Examiner—Richard E. Berger
Attorney, Agent, or Firm—Diller, Ramik & Wight

[57] ABSTRACT

The invention provides a side-looking coherent pulse radar for use on a moving platform and for exploring space laterally with respect to the displacement of the platform. The receiver includes a detector which coherently detects echo signals having a Doppler component and applies these to a correlation processor which samples the detector output signals and performs a correlation process with a reference correlation waveform having a center frequency which is chosen to bear a predetermined relationship with the Doppler frequency component of the received echo pulses. Sensors derive the accelerations of the platform in three mutually orthogonal planes (one of which is in the platform displacement direction) and the parameters derived by the sensors are utilized to maintain the aforementioned predetermined relationship as the Doppler frequency component of the echo pulses vary with movement of the platform from the required displacement direction.

13 Claims, 7 Drawing Figures

SIDE-LOOKING RADAR SYSTEMS

This invention relates to side-looking radar systems and more particularly side-looking coherent radar systems. Such radar systems may be used to produce a photographic type record or radar map from received echo signals which are representative of moving or stationary targets on the surface of the earth. It may be noted that the term "stationary target" as used herein, includes targets which move parallel to the displacement of a platform upon which the system is mounted and that by the term "moving targets" as used herein, is meant targets which have a radial component of velocity with respect to the platform upon which the system is mounted.

The radar system is coherent so that the useful received echoes originate from pulses obtained by pulse modulating a continuous wave, or each pulse is phase detected with respect to a reference wave which is phase locked with the carrier of the transmitted pulse from which the considered echo originates.

In a known side-looking coherent pulse radar system, such as that described in our U.K. Pat. No. 1,455,871, the radiation pattern of the antenna system, both for transmission and reception, is formed by a symmetrical, directive single lobe, the gain of which is a maximum along the symmetry axis, and which axis is directed perpendicularly to the direction of displacement of the platform upon which the radar system is mounted. The processing of received echoes is based on the determination of the instant at which the Doppler frequency of a given target goes through zero; at this instant a stationary target is located exactly on the symmetry axis. A system for determining the instant at which the Doppler frequency goes through zero is described in our said U.K. Patent in which the received echoes are stored in a correlation processor and the echoes received in a time $\tau$ multiplied by a reference, or correlation waveform, and the products therefrom summed. If, as is also described in our U.K. Patent, the correlation waveform has a centre frequency which is offset relative to sampled, received echo pulses by substantially one half the transmitted pulse repetition frequency of the radar, moving targets may be displayed. The good performance of such systems, that is the obtaining of a radar map from the system which is a faithful record of the true radar scene substantially free from amplitudinal and positional distortions, depends at least in part upon the stability of motion of the platform upon which the radar system is mounted. It necessitates the maintaining of the platform displacement direction, or track, and the direction of the antenna symmetry axis orthogonal to that direction. Therefore, it is required that corrections be applied to compensate for unwanted platform motion in the vertical or horizontal across track direction and for platform wander or yaw, resulting in the radar beam departing from orthogonality to the displacement direction. Across track motion and/or yaw are herein termed attitude movements of the platform from a required direction of displacement.

In known systems, the effect of vertical or across track motion is reduced by analogue compensation within the radar receiver while attempt at correcting the platform yaw is made by gyro-stabilisation of the antenna. However, such compensations tend to be expensive to effect, especially the mechanical gyro-stabilisation of the antenna. Accordingly, the present invention seeks to provide a side-looking coherent pulse radar system which is less costly for substantially correcting the attitude movements of the platform.

According to this invention, a side-looking coherent pulse radar for use on a moving platform and for exploring space laterally with respect to the displacement direction of the platform includes a receiving means having a detector arranged to coherently detect echo pulses having a Doppler frequency and to apply output signals to a correlation processor means, said correlation processor means being arranged to sample the detector output signals and to perform a correlation process with a reference correlation waveform having a centre frequency which is chosen to bear a predetermined relationship with the Doppler frequency component of the received echo pulses, and means for deriving movement and attitude parameters of the platform including means arranged to determine the acceleration of the platform in three mutually orthogonal planes where one of the planes is in the platform displacement direction such that, in operation, said parameters are utilised to maintain said predetermined relationship as the Doppler frequency component of the echo pulses vary with movement of the attitude of the platform from the required displacement direction.

Advantageously, the correlation processor is arranged to provide output samples comprising two series of samples in phase quadrature to one another and to apply said samples to a detector.

Preferably, the means arranged to determine the acceleration of the platform comprises inertial accelerometers and conveniently, an inertial accelerometer is attached to each end of a normally provided radar antenna mounted on the platform and having a longitudinal axis along the displacement direction, and additional accelerometers are arranged to determine the platform acceleration in two mutually orthogonal directions which are both orthogonal to the displacement direction.

In a currently preferred embodiment, the centre frequency of the correlation waveform is adjusted to maintain said predetermined relationship.

When the platform is subject to across-track motion so that the range of the radar from a target is caused additional variation from a required flight path, it is a preferred feature of this invention that the means for deriving movement and attitude parameters further include means for providing the velocity of the platform, the range of the radar from a target illuminated thereby, and the horizontal angle of inclination of the radar beam, whereby, to correct for across-track motion, the correlation waveform is shifted in frequency by $$-\frac{2\ddot{R}_o \Delta d}{\lambda V}$$

between output samples of the correlation processor means
where
 V = the platform velocity in the desired direction of displacement,
 $\lambda$ = the wavelength of the radiated beam
 $\Delta d$ = an increment in the platform displacement between outputs from the correlation processor means at increments in time of $\Delta t$, and $R_o$ = the slant range of the antenna from an illuminated object at a time t=0, and
$\ddot{R}_o$ = the acceleration of the antenna in the slant range direction.

When the platform yaws so the radar beam deviates from orthogonality to the displacement direction, it is a further preferred feature of this invention that the means for deriving movement and attitude parameters further include means for providing the velocity of the platform, the range of the radar from a target illuminated thereby, the angle of inclination to the horizontal of the radar beam, and the angular deviation of the beam from orthogonality to the displacement direction whereby to correct for yaw motion, the correlation waveform is shifted by a frequency $$\frac{-2V}{\lambda R}\left[(1 + \frac{R\dot{\theta}}{V})^{-1} - 1\right]\Delta d$$

between output samples of the correlation processor means
where
  V = the platform velocity in the desired direction of displacement,
  $\lambda$ = the wavelength of the radiated beam
  R = the slant range from the antenna to an illuminated target,
  $\Delta d$ = an increment in the platform displacement between outputs from the correlation processor means at increments in time of $\Delta t$,
  $\theta$ = angular deviation of the radar beam from orthogonality to the displacement direction, and
  $\dot{\theta}$ = first derivative of $\theta$ with respect to time.

Because, in a known side-looking coherent radar system the output from the processor means is derived at predetermined fixed intervals of time so that when the platform, and hence the beam, yaws, the apparent distance between two illuminated targets appears either to increase or decrease in dependence upon the direction of yaw, the present invention advantageously provides that when the platform is subjected to yaw, the incremental time $\Delta t$ at which output samples are derived from the correlation processor means is determined by $$\Delta t = \frac{\Delta d}{V}(1 + \frac{R\dot{\theta}}{V})^{-1}$$

Preferably, when the Doppler frequency shift in the received echo pulses is due to both across-track motion and yaw the correlation processor means causes movement of the centre frequency of the reference correlation waveform in accordance with $$\frac{-2V}{R}\left[(1 + \frac{R\ddot{R}_o}{V^2})(1 + \frac{R\dot{\theta}}{V})^{-1} - 1\right]\Delta d$$

between output samples of the correlation processor means

It will thus now be seen that the effect of attitude movements of the platform from a required direction of displacement are substantially reduced during the stage of processing of the radar echoes.

The invention will now be described, by way of example, with reference to the accompanying drawings in which.

In the Figures like reference numerals denote like parts.

The basis of the invention will first of all be described in mathematical terms with reference to FIGS. 1, 2, 3a and 3b.

Referring to FIGS. 1, 2, 3a and 3b a moving platform P assumed to be an aeroplane has a desired displacement direction along an x axis, the y axis being horizontal to, and the z axis being vertical to the x axis so that the three axes x, y and z are all mutually orthogonal to one another. It should be noted that in the specification the dot notation has been employed to signify a differential with respect to time so that, for example, $\ddot{x}$ is the second differential of x with respect to time. The antenna 1, shown only in FIG. 4, has a longitudinal axis which is mounted on the underside of the aeroplane P to lie along the displacement direction x and is directed laterally towards a ground target T sub-tending an angle $\alpha$ to the horizontal plane direction y. The aeroplane P is assumed to have a velocity V feet per second, to commence flying at a time t=0 and to have a slant range from the antenna to the target of R. The distance of the target T from the origin where t=0 is d and assuming the correlation processor to have a constant output rate as a function of along track distance, then the distance travelled by the aeroplane P in an interval $\Delta t$ between successive output samples of the correlation processor is $\Delta d$.

Figure 2:
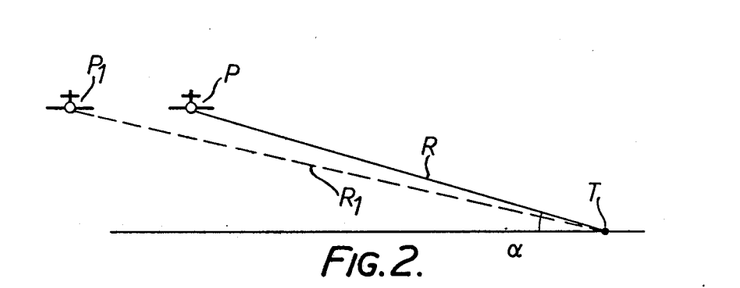
FIG. 2 shows a sectional view of the geometry shown in FIG. 1 viewed in a plane orthogonal to the displacement direction of the platform.
Figure 3A:
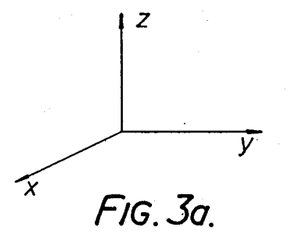
FIGS. 3a and 3b show the direction of the accelerometer readings.
Figure 3B:
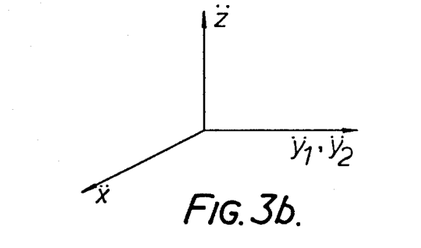

First, consider the across-track motion which has a non-zero component in the radial direction from the aeroplane P to the target T. Such a situation is shown in FIG. 2 where the aeroplane P is taken to be flying along the required displacement direction and due to across-track motion the aeroplane moves to a different non-preferred track as signified by the aeroplane $P_1$ having a slant range $R_1$ to the target T. The variation from the desired displacement direction is given by $R_o$ where $R_o = R_1 - R$ and is assumed to be positive in a direction measured away from the target.

The movement of the aeroplane causes a frequency shift in the returned radar echo of $-(2/\lambda)\dot{R}_o$ Hz where $\lambda$ is the wavelength of the transmitted radar beam.

This Doppler frequency is required to be matched to the centre frequency of the reference correlation waveform which is a linear frequency modulated waveform. Since the frequency slope of the correlation waveform is $$(-2V^2/\lambda R) \text{ Hz/sec} \tag{1}$$

the shift in frequency can be related to an apparent time shift $t^c$
Where $$\frac{-2V^2}{\lambda R_o} t^c = \frac{-2}{\lambda} \dot{R}_o$$

Hence within a processing interval between output samples of the correlation processor of $\Delta t$, the increment in $t^c$ is $$\Delta t^c = \frac{R\ddot{R}_o}{V^2} \Delta t. \tag{2}$$

to a first order approximation.
Now $\Delta t = \Delta d/V$
Therefore, $\Delta t^c = R\ddot{R}_o \Delta d/V^3$
Thus, so that the Doppler frequency component of the received echo pulses substantially match the centre frequency of the reference correlation waveform, the centre frequency of the reference correlation waveform between output samples is shifted by $$\left[\frac{-2V^2}{\lambda R}\right]\left[\frac{R\ddot{R}_o \Delta d}{V^3}\right] = \frac{-2\ddot{R}_o \Delta d}{\lambda V} \tag{3}$$

Figure 1:
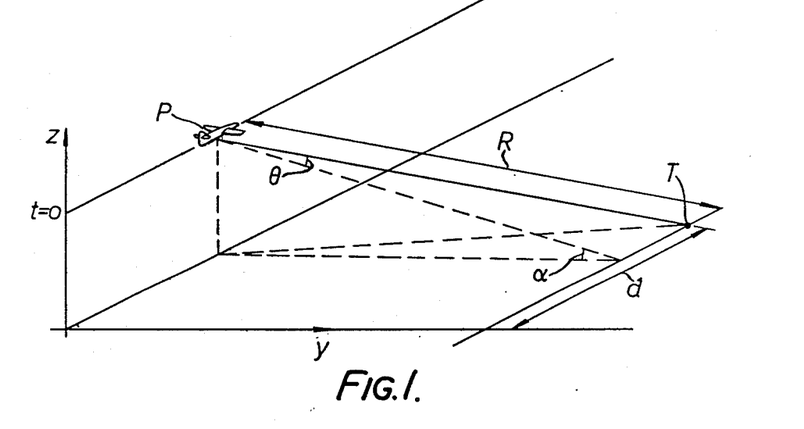
FIG. 1 shows a perspective view of the geometry of a side-looking coherent radar system in accordance with this invention.

Second, when the aeroplane P yaws, the radar beam deviates from orthogonality to the displacement direction by an angle $\theta(t)$ where t is the time relative to the origin $t=0$, so that a Doppler frequency component is produced in the echo pulses due to the yaw. At a slant range R the long track displacement of the beam centre is $$d(t) = \int_0^t V(t') dt' + R \sin \theta(t)$$

where $V(t')$ is the carrier velocity in the required displacement direction.
Assuming that $\theta(t)$ is small then $$\sin \theta(t) \simeq \theta(t)$$

Thus, the incremental displacement $\Delta d$ is given by $$\Delta d = (V + R\dot{\theta})\Delta t \tag{4}$$

$$= \left(1 + \frac{R\dot{\theta}}{V}\right) V \Delta t$$

Therefore, $\Delta t = \frac{\Delta d}{V}\left(1 + \frac{R\dot{\theta}}{V}\right)^{-1}$ i.e. the incremental time between output samples of the correlation processor.
Since the frequency slope of the reference correlation waveform is required to substantially match that of the received echo signal at range R, the centre frequency of the reference correlation waveform must be shifted to correspond with the frequency shift in the returned echo and this frequency shift may be expressed in a corresponding increment of time $$\Delta t^r = \Delta t - (\Delta d/V) \tag{5}$$

where the suffix r refers to the reference.
Substituting for $\Delta t$, this incremental time $\Delta t^r$ can be expressed as a frequency shift of the correlation waveform between output samples of $$\left(\frac{-2V^2}{\lambda R}\right)\left(\frac{\Delta d}{V}\left[\left(1 + \frac{R\dot{\theta}}{V}\right)^{-1} - 1\right]\right) = \tag{6}$$

$$\frac{-2V}{\lambda R}\left[(1 + \frac{R\dot{\theta}}{V})^{-1} - 1\right]\Delta d$$

It will, of course, be noted that $\Delta t^r = 0$ when $\dot{\theta} = 0$ and that $\Delta d$ is related to the resolution of the radar system in the displacement direction.

Since the radar is pulsed, the processing requires that $\Delta t$ and $\Delta t^r$ be rounded to a whole number of interpulse periods, with care being taken to carry any rounding errors forward into the next processing interval.

It will further be noted that a situation can arise where $$R\dot{\theta}/V \leq -1 \tag{7}$$

when $\Delta t < 0$ which implies that the centre of the radar beam is stationary with respect to the ground plane or is traversing terrain which has already been swept by the radar. Under such circumstances, it is necessary to suspend processing at that instant $t_s$ with the along track displacement being $d_s$, until $d(t) > d_s$.

To substantially accommodate for both across-track and yaw motion, equations (3) and (6) are added together to provide a total reference waveform shift $$\Delta t^{rc} = \frac{\Delta d}{V}\left[(1 + \frac{R\ddot{R}_o}{V^2})(1 + \frac{R\dot{\theta}}{V})^{-1} - 1\right] \tag{8}$$

To provide a frequency shift of the centre frequency of the reference correlation waveform between output samples of the correlation processor $\Delta t^{rc}$ is multiplied by $-2V^2/R$, thus:

$$\left(\frac{-2V^2}{R}\right)\left(\frac{\Delta d}{V}\left[\left(1 + \frac{R\ddot{R}_o}{V^2}\right)\left(1 + \frac{R\dot{\theta}}{V}\right)^{-1} - 1\right]\right) = \tag{9}$$

$$\frac{-2V}{R}\left[\left(1 + \frac{R\ddot{R}_o}{V^2}\right)\left(1 + \frac{R\dot{\theta}}{V}\right)^{-1} - 1\right]\Delta d$$

Figure 4:
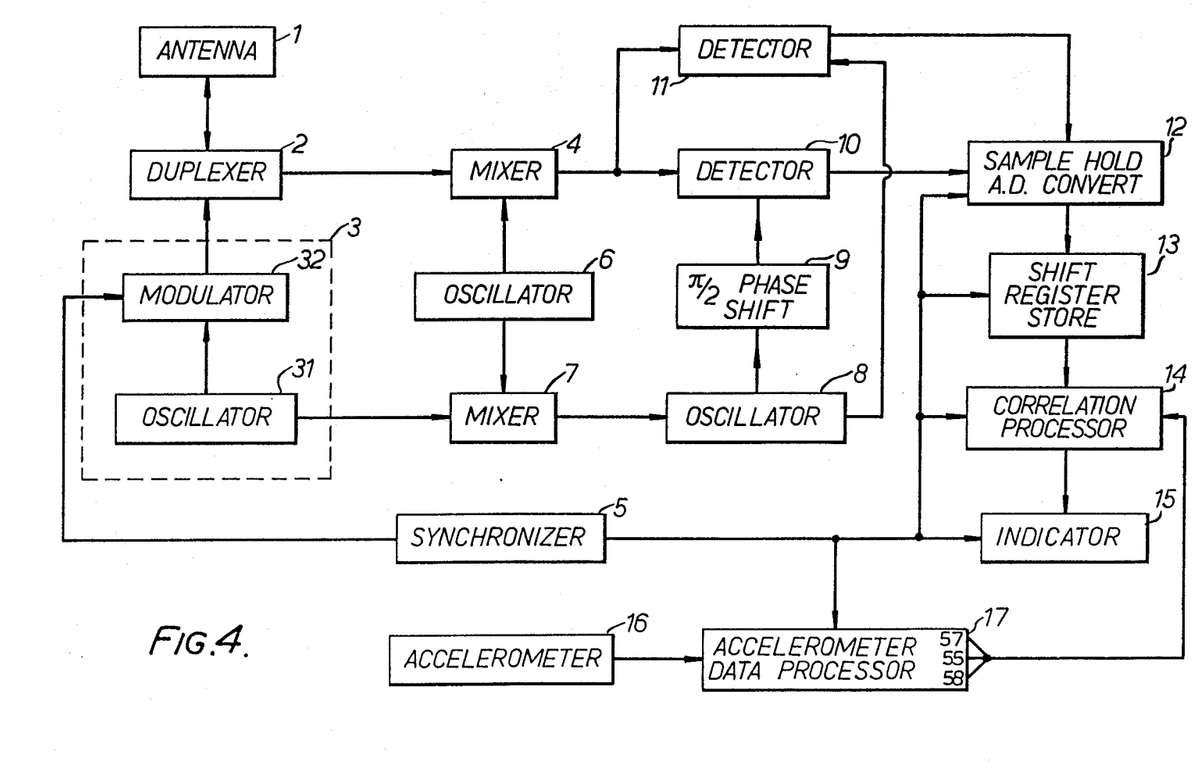
FIG. 4 shows a block schematic diagram of a side-looking coherent radar system in accordance with this invention.

Referring now to the apparatus shown in FIG. 4, the side-looking coherent pulse radar system has an antenna 1 alternately fed via a duplexer 2 by a transmitter 3 and to an input of a receiver mixer 4. The transmitter 3 includes an oscillator 31 and a pulse modulator 32 which is arranged to be unblocked by a synchroniser 5. A local oscillator 6 is connected to a further input of the mixer 4 and also to an input of a further mixer 7, a further input of the mixer 7 being connected to the oscillator 32 so as to provide coherent operation of an oscillator 8 connected to the output of the mixer 7 with return signals at the output of the mixer 4. The oscillator 8 is adapted to supply reference in phase and, via a $\pi/2$ phase shifter 9, phase quadrature signals to a pair of phase detectors 10, 11, each connected to the output of the mixer 4.

The transmitted pulses are considered as being supplied by a magnetron pulsed oscillator, however it will be realised by those skilled in the art, that, if the transmitted pulses are provided by chopping a signal from a continuous stable signal oscillator, the signal 8 may be omitted so that the mixer 7 directly supplies signals to the phase shifter 9 and detector 10.

For the sake of clarity of various amplifications stages required for high frequency and medium frequency transmission and reception have not been shown, since these stages may adopt any form known per se.

Output from the detectors 10, 11 and from the synchroniser 5 is fed to an analogue-to-digital converter 12 which produces two series of binary numbers representing the amplitudes of the two analogue reference waveforms fed thereto from the phase detectors 10, 11. The synchroniser 5 controls the analogue-to-digital converter 12 so that m samples are produced at instants of time $n\Delta$, $(n+1)\Delta$, ...$(n+m-1)\Delta$ after a pulse is transmitted from the transmitter 3, where n is a whole number and $\Delta$ is the sampling interval which, in the present example, is chosen to be approximately one half the time duration of the transmitted pulse so that there are two samples per transmitted pulse length. For each sampling instant m there is provided a pair of shift registers (not separately shown) within a shift register store 13 which is also clocked by the synchroniser 5. Each of the shift registers has l locations and is arranged such that after each transmitted pulse each one of the m shift register pairs receives one new pair of in-phase and phase quadrature samples, and a further pair of samples is passed from the outputs of the pair of shift registers to a correlation processor 41 clocked by synchronising pulses from the synchroniser 5. Thus, each shift register stores the last l in-phase or phase quadrature amplitude samples of signals received from targets at one particular range.

The operation of the correlation processor 14 will now be described for one pair of the m pairs of shift registers, the processing for all other pairs of shift registers being similar. The samples in the in-phase shift register at time t will be labelled $p_{t+1}, p_{t+2}, \ldots p_{t+l}$ and those in the phase quadrature shift register will be labelled $q_{t+1}, q_{t+2}, \ldots q_{t+l}$, where t represents some whole number of pulse intervals. The correlation processor 14 multiplies each of the samples by $a_t r_{+i}$ and $b_t r_{+i}$ where $i = 1, 2 \ldots l$ which are amplitude modulated in phase and phase quadrature samples respectively of a reference linear frequency modulated waveform, herein referred to as a reference correlation waveform. The reference correlation waveform may be centred on zero Doppler frequency shift between transmitted and received signals in which case an indication of stationary targets may be derived or the centre frequency of the correlation waveform may be offset from zero Doppler frequency shift by one half of the pulse repetition frequency so that an output indicative of moving targets may be derived. The correlation waveform samples a and b are generated over a length greater than simply the l samples needed for the correlation. Thus, the integer $t^r$ defines the first sample of the correlation waveform (and the succeeding l samples) used in the correlation at pulse interval t. Four inertial accelerometers, denoted by the block 16, are provided to measure the acceleration of the antenna in the x, y and z directions of FIG. 3a with two accelerometers connected on the longitudinal y axis along the displacement direction. Thus, inertial accelerometer measurements y1 and y2 are derived in the y direction where y1 and y2 are separated by a distance L. The outputs from the inertial accelerometers 16 are applied to an accelerometer data processor 17, to be described with reference to FIGS. 5 and 6, which receives clock synchronizing pulses from the synchroniser 5 and applies an output to the correlation processor 14 so that the predetermined relationship between the centre frequency of the reference correlation waveform and the Doppler frequency of the received echo pulses is maintained, and so that the output rate of samples from the correlation processor is at equal along track intervals, which because of yaw are not necessarily at equal increments of time.

Quadrature samples U and V are produced at time t from the correlation processor and may be expressed as follows:

$$U_t = \sum_{i=1}^{l} (p_{t+i} a_{t'r+i} + q_{t+i} b_{t'r+i})$$

$$V_t = \sum_{i=1}^{l} (p_{t+i} b_{t'r+i} - q_{t+i} a_{t'r+i})$$

Output from the correlation processor 14 is passed to a display indicator 15 which also receives clock pulses from a synchroniser 5. The indicator 15 requires a unipolar (e.g. positive only), and this is obtained from $U_t$ and $V_t$ by a known non-linear operation such as modulus detection, which employs modulus $|U_t|+|V_t|$ or square law detection, which employs $U_t^2+V_t^2$. The output is then displayed in a manner known per se by an indicator 15.

Successive outputs from the correlation processor 14 are obtained at times $t_1, \ldots t_{n-1}, t_n, t_{n+1} \ldots$ where $t_n$ is defined by $$t_n = t_{n-1} + \Delta t_{n-1}$$

where n denotes the nth output.

Thus the first sample of p and q used in the correlation process may be obtained and in a similar manner the first sample of a and b of the correlation waveform samples is given by $$t_n^r = t_{n-1}^r + [\Delta t_{n-1}^{rc}]$$

where $\Delta t^{rc}$ is given in equation (9).

Figure 5:
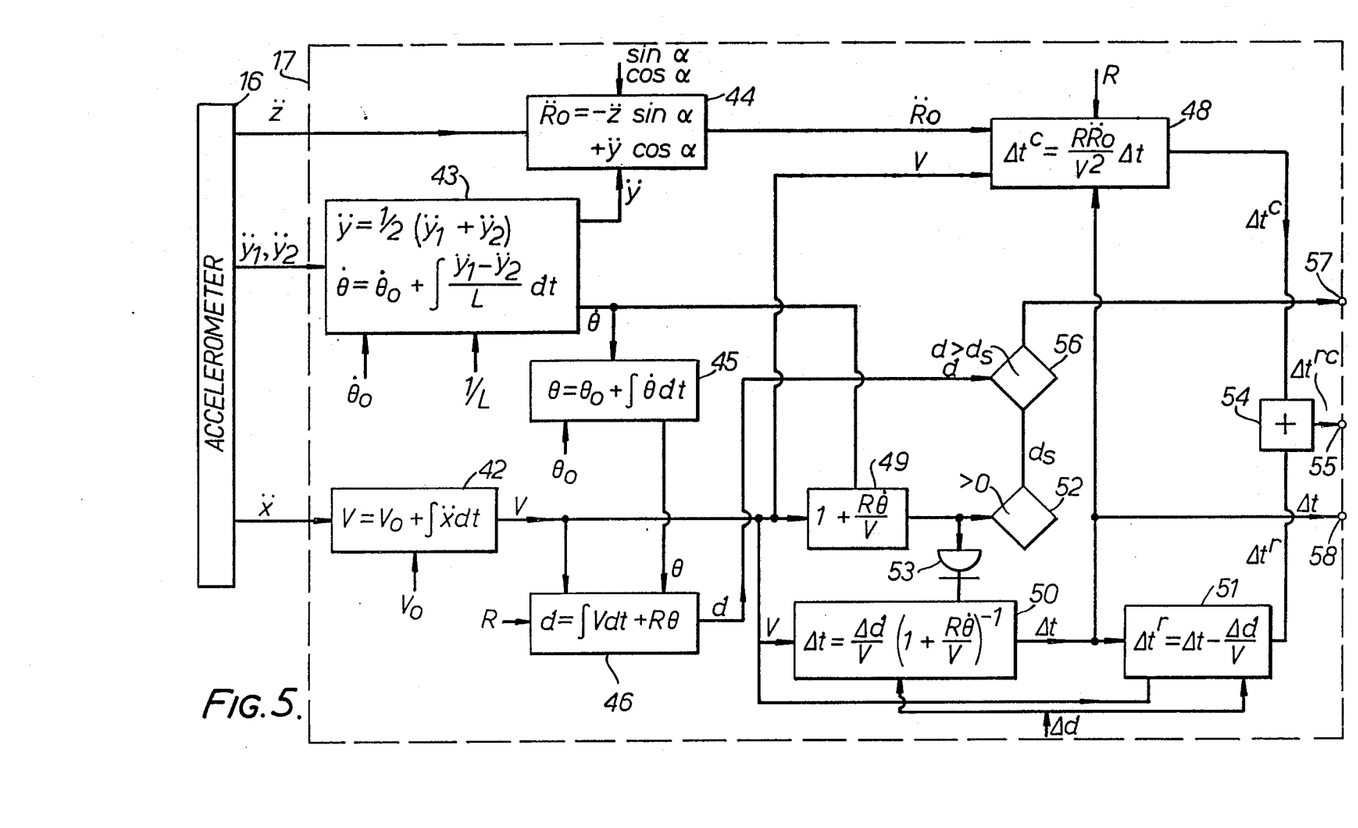
FIG. 5 shows a block schematic form a flow diagram in which the movement and attitude parameters of the platform are derived in a form suitable for use by a correlation processor and FIG. 6 shows in block schematic form an apparatus for performing the functions of the flow diagram of FIG. 5.
Figure 6:
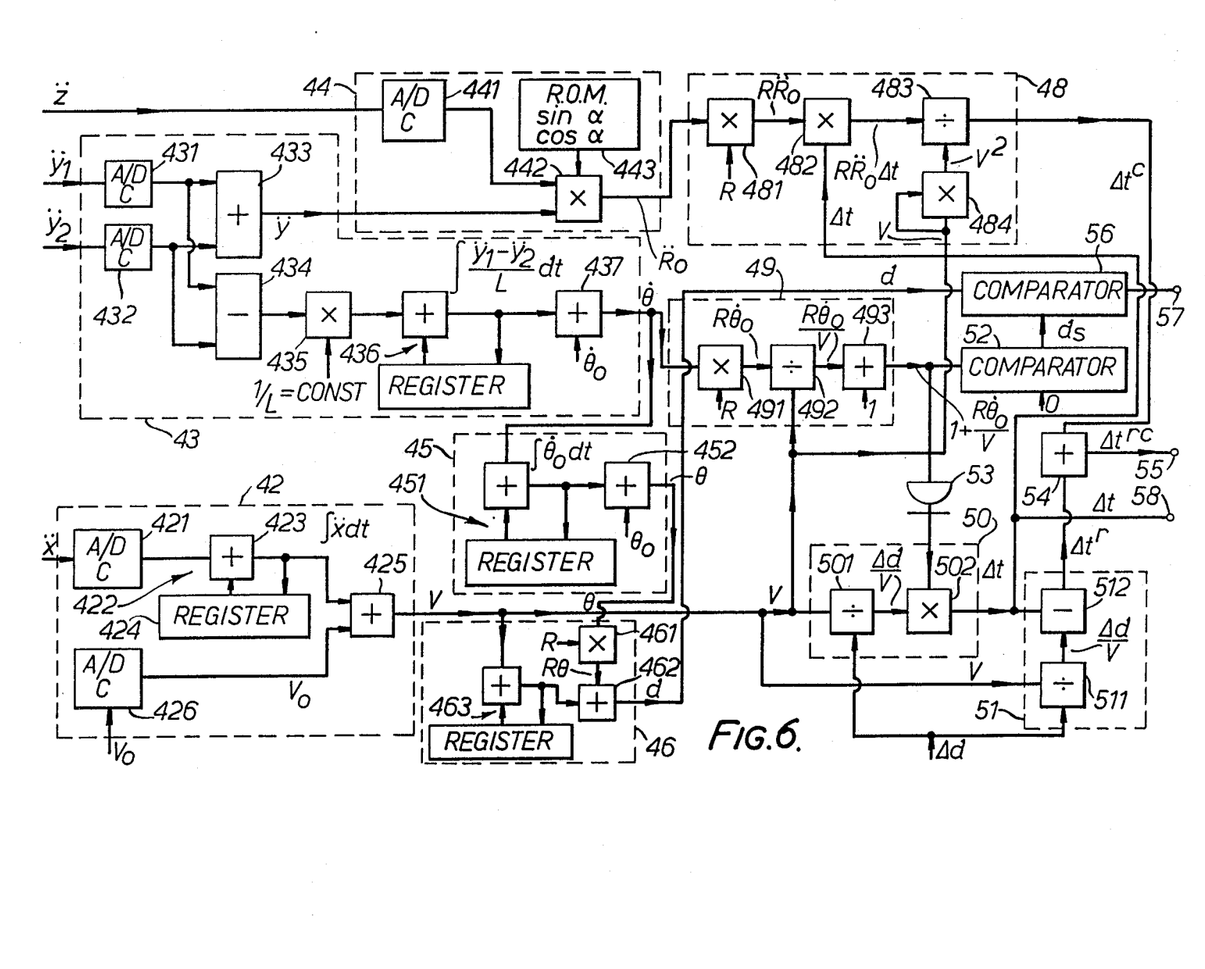

Referring now to FIG. 5, the acceleration parameters $\ddot{x}$, $\ddot{y}_1$, $\ddot{y}_2$ and $\ddot{z}$ are derived from the accelerometer 16 and $\ddot{x}$ is applied to a block 42 where V is evaluated, $\ddot{y}_1$ and $\ddot{y}_2$ are applied to a block 43 where $\dot{\theta}$ and $\ddot{y}$ are evaluated and $\ddot{z}$ is applied to a block 44 where $R_o$ is evaluated. V is evaluated by evaluating the function $V_o + \int \ddot{x} dt$, where $V_o$ is the velocity at time $t=0$. It should be noted that in the blocks of FIGS. 5 and 6, all integrals are assumed to have limits 0 to t. The block 43 evaluates $\dot{\theta}$ from the equation $$\dot{\theta} = \dot{\theta}_o + \int \frac{\ddot{y}_1 - \ddot{y}_2}{L} dt,$$

where $\theta_o$ is the angle of yaw at time $t=0$, and $\ddot{y}$ is derived from the equation $\ddot{y}=\frac{1}{2}(\ddot{y}_1+\ddot{y}_2)$. The $\ddot{y}$ output of the block 43 is applied as one input to a block 44 where $\ddot{R}_o$ is evaluated, the block 44 having as another input $\ddot{z}$. $\ddot{R}_o$ is evaluated from the equation $\ddot{R}_o=-\ddot{z}\sin\alpha+\ddot{y}\cos\alpha$ where $\alpha$ is assumed to depend upon the slant range R. With knowledge of $\theta_o$, the output $\dot{\theta}$ from the block 43 is applied to a block 45 where $\theta$ is derived from the equation $\theta=\theta_o+\int\dot{\theta}dt$ and output from the block 45 and from the block 42 is applied to a block 46 where d is evaluated from $d=\int Vdt+R\theta$. The output of V from block 42 is also applied to blocks 48, 49, 50 and 51, where block 49 also receives as an input $\dot{\theta}$ and evaluates $(1+(R\dot{\theta}/V))$ which is applied directly to a comparator 52 and, via an inverter 53, to the block 50. The block 50 also receives as an input $\Delta d$ which is a constant, representative of incremental along track displacement, and hence evaluates $\Delta t$ in accordance with equation (4). The output $\Delta t$ from block 50 is applied as one input to both of blocks 48 and 51. The block 48 receives at a further input $\ddot{R}_o$ and evaluates $\Delta t^c$ in accordance with equation (2) and block 51 receives at a further input $\Delta d$ and evaluates $\Delta t^r$ in accordance with equation (5). Output from the blocks 48 and 51 are added in an adding network 54 to provide $\Delta t^{rc}$ in accordance with equation (8) which is applied as an input to the correlation processor 14 to shift the centre frequency of the correlation waveform by multiplication with equation (1).

The comparator 52 determines whether the function evaluated by block 49 is greater than zero, it being remembered from equation (7) that this is a requirement for the scanning beam to be traversing terrain that has not previously been swept by the radar. When the output from the comparator 52 is greater than zero, then an output is applied to one input of a further comparator 56, the comparator 56 having a further input derived from the block 46. The function of the comparator 57 is to memorise the distance $d_s$ at which output from the comparator 52 goes less than zero and to compare this distance with the output from the block 46 so that if $d<d_s$ no new terrain is being traversed by the radar beam and a disenable output is produced at a terminal 57 for application to the correlation processor 14 to stop it sampling. When d becomes greater than $d_s$ then the sign of the signal at terminal 57 is reversed and the correlation processor is once again enabled.

An output $\Delta t$ from the block 50 is applied to a terminal 58 for application to the correlation processor 14 so that the rate at which output samples are applied from the correlation processor 14 to the indicator 15 is varied in dependence upon the angle of yaw.

The apparatus for performing the functions of the flow diagram of FIG. 5 will now be described with reference to FIG. 6. In FIG. 6, the block 42 receives as an input $\ddot{x}$ in an analogue form which is converted to a digital format in an analogue-to-digital converter 421. The output of the analogue-to-digital converter 421 is applied to an integrating network 422 which operates in manner known per se and comprises an adding network 423 arranged to have in a feedback loop a shift register 424. The output from the adding network 423, $\int\ddot{x}dt$ is applied to a further adding network 425 which receives at a further input thereof, $V_o$. $V_o$ is derived from a velocity measuring equipment normally provided in an aeroplane in an analogue format and is converted to digital format by an analogue-to-digital converter 426 prior to application to the adding network 425.

The block 43 comprises analogue-to-digital converters 431 and 432 receiving $\ddot{y}_1$ and $\ddot{y}_2$ respectively, output from both of the converters being applied to an adding network 433 and a subtracting network 434. The adding network 433 is arranged to add $\ddot{y}_1$ and $\ddot{y}_2$ and divide the resultant by two so as to provide $\ddot{y}$. The output from the subtractor, $\ddot{y}_1-\ddot{y}_2$, is applied to a multiplier 435 where the resultant of the subtraction is multiplied by the constant 1/L (the reciprocal of the distance between inertial accelerometers $y_1$ and $y_2$). The result of the multiplication is applied to an integrator 436, again comprising an adding network having a shift register in a feedback loop thereof, and the resultant integration is applied to an adding network 437 having a further input applied with $\dot{\theta}_o$ so that the output of the network 437 provides $\dot{\theta}$.

$\ddot{z}$ is converted from analogue-to-digital form in a converter 441 in the block 44 and the digital output from the converter is applied to a multiplier 442 having a further input receiving $\ddot{y}$. A read-only memory 443 holds the parameters $\sin\alpha$ and $\cos\alpha$ which are applied to yet a further input of the multiplier 442 which is arranged to evaluate $\ddot{R}_o$ and to apply $\ddot{R}_o$ to a multiplier 481 in the block 48. The slant range R is derived from measuring equipment, not shown, and applied to a further input of the multiplier 481 so that the product $R\ddot{R}_o$ is evaluated and applied to a further multiplier 482. The further multiplier 482 receives at another input $\Delta t$ (evaluated by block 50) and the resultant of this multiplication is applied to a divider 483. The devisor, $V^2$ is obtained by applying the output V from block 42 to both inputs of a multiplier 484 and applying the resultant output to a further input of the divider 483, thereby producing $\Delta t^c$.

The block 45 has an integrating network 451 receiving as an input $\dot{\theta}$, from the block 43 which is thus integrated and applied to an adder 452 receiving $\theta_o$ at a further input so as to provide $\theta$ at the output of the adder 452.

The angle $\theta$ is applied to one input of a multiplier 461 in the block 46 and the multiplicand R is applied to a further input of the multiplier 461. The resultant, $R\theta$, is applied to one input of an adding network 462 which receives at another input $\int Vdt$ derived by applying V from block 42 to an integrator 463.

The output $\dot{\theta}$ from block 43 is also applied to a multiplier 491 in the block 49, the multiplier 491 receiving R at a further input and the resultant $R\dot{\theta}_o$ is applied to one input of a divider 492. At a further input of the divider 492 is applied V and the resultant of the division, $R\dot{\theta}_o/V$ is applied to an adder 493 where it is added to a constant, 1, which is applied to a further input of the adder. The output of the adder 493 is applied to one input of the comparator 52 which has a further input connected to 0 and the resultant of the comparison, $d_s$ is applied to one input of the comparator 56 which has a further input applied with d and which compares $d_s$ with d. The resultant of this comparison is applied to terminal 57 to either enable or disenable the correlation processor 14 and is thus indicative of whether the scanning radar beam is traversing terrain, not previously scanned. The constant $\Delta d$ is applied to a divider 501 in the block 50 where it is divided by V, and the divider output 501 is applied to a multiplier 502 where it is, in turn, multiplied by the inverse of the output from the adding network 493 to provide at the output of the multiplier 502, $\Delta t$.

The block 51 comprises a divider 511 fed at its input terminals with V and $\Delta d$ to provide an output representative of Δd/V which is subsequently applied to one input of a subtracting network 512. A further input to the subtracting network 512 is Δt and the resultant of the subtraction, Δt$^r$, is applied to one input of the adding network 54, whereupon it is added with the other input Δt$^c$ to provide Δt$^{rc}$ at the terminal 55.

It will be noted that in the FIGS. 5 and 6 the connections to the synchroniser 5 have been omitted for clarity.

I claim:

1. A side-looking coherent pulse radar for use on a platform adapted to move in a preferred manner but subject to deviations from said preferred manner, the radar including a receiving means having a detector arranged to detect echo pulses having a Doppler frequency component and to apply output signals to a correlation processor means, said correlation processor means including means for sampling the detector output signals, means for producing a reference correlation signal which characterizes an output from the receiver which would be expected from a target when the platform is moving in the said preferred manner, and means for performing a correlation process on said output signals of the detector with said reference correlation signal to provide information concerning the positions of objects, the radar also including means for deriving signals representing said deviations and means for utilizing the signals to effect an adjustment such that the output of the processor means is compensated for the said deviations.

2. A radar as claimed in claim 1 and wherein the correlation processor means is arranged to provide output samples comprising two series of samples in phase quadrature to one another and to apply said samples to a detector.

3. A radar as claimed in claim 1 and wherein the means for deriving signals comprises inertial accelerometers.

4. A radar as claimed in claim 3 and wherein an inertial accelerometer is attached to each end of a normally provided radar antenna mounted on the platform and having a longitudinal axis along the displacement direction, and additional accelerometers are arranged to determine the platform acceleration in two mutually orthogonal directions which are both orthogonal to the displacement direction.

5. A radar as claimed in claim 1 and wherein the centre frequency of the correlation signal is adjusted.

6. A radar as claimed in claim 1 and wherein the means for deriving signals further include means for providing the velocity of the platform, the range of the radar from a target illuminated thereby, and the horizontal angle of inclination of the radar beam, whereby, to correct for across-track motion, the correlation signal is shifted in frequency by $$-(2\ddot{R}_o \Delta d / \lambda V)$$

between output samples of the correlation processor means
Where
V = the platform velocity in the desired direction of displacement,
λ = the wavelength of the radiated beam
Δd = an increment in the platform displacement between outputs from the correlation processor means at increments in time of Δt, and
$R_o$ = the slant range of the antenna from an illuminated object at a time t=0, and
$\ddot{R}_o$ = the acceleration of the antenna in the slant range direction.

7. A radar as claimed in claim 1 and wherein the means for deriving signals further include means for providing the velocity of the platform, the range of the radar from a target illuminated thereby, the angle of inclination to the horizontal of the radar beam, and the angular deviation of the beam from orthogonality to the displacement direction whereby, to correct for yaw motion, the correlation signal is shifted by a frequency $$\frac{-2V}{\lambda R}\left[(1 + \frac{R\dot{\theta}}{V})^{-1} - 1\right]\Delta d$$

between output samples of the correlation processor means
where
V = the platform velocity in the desired direction of displacement,
λ = the wavelength of the radiated beam
R = the slant range from the antenna to an illuminated target,
Δd = an increment in the platform displacement between outputs from the correlation processor means at increments in time of Δt,
θ = angular deviation of the radar from orthogonality to the displacement direction, and
$\dot{\theta}$ = first derivative of θ with respect to time.

8. A radar as claimed in claim 7 wherein the output from the processor means is derived at predetermined fixed intervals of time and wherein the incremental time Δt at which output samples are derived from the correlation processor means is determined by $$\Delta t = \frac{\Delta d}{V}(1 + \frac{R\dot{\theta}}{V})^{-1}.$$

9. A radar as claimed in claim 1 and wherein the correlation processor means causes movement of the centre frequency of the reference correlation signal in accordance with $$\frac{-2V}{R}\left[(1 + \frac{R\ddot{R}_o}{V^2})(1 + \frac{R\dot{\theta}}{V})^{-1} - 1\right]\Delta d$$

between output samples of the correlation processor means.

10. In a side-looking coherent pulse radar for use on a moving platform, which radar includes antenna means carried by the platform for pulse illuminating a target area with a symmetrical, directive single lobe, the gain of which is a maximum along the symmetry axis and which symmetry axis if fixed relative to the longitudinal axis of the platform, transmitting means connected to said antenna means for periodically energizing same to pulse illuminate the target area, receiving means connected to said antenna means for coherently detecting echoes returned by objects in the illuminated target area, said symmetry axis being fixed relative to said longitudinal axis of the platform whereby successive echo returns from the same target exhibit a unique variation of Doppler shift, relative to the corresponding illuminating pulses, due to ideal movement of said platform in which said longitudinal axis thereof moves along a straight line track, and correlation processor means connected to said receiver for producing a variable frequency correlation waveform having a center frequency bearing a predetermined relationship with said unique variation of Doppler shift whereby a true radar scene is obtained to the extent that said platform follows said ideal movement, the improvement which comprises:

means on said platform for detecting deviations of platform movement from said ideal movement and for producing signals indicative thereof; and said correlation processor means including means controlled by said signals for modifying said predetermined relationship to compensate for said deviations of platform movement.

11. In a side-looking coherent pulse radar as defined in claim 10 wherein said symmetry axis is fixed substantially perpendicular to said longitudinal axis of the platform.

12. In a side-looking coherent pulse radar as defined in claim 10 wherein said predetermined relationship is such that the center frequency of said correlation signal is centered on zero Doppler frequency shift of said echo returns.

13. In a side-looking coherent pulse radar as defined in claim 10 wherein said predetermined relationship is such that the center frequency of said correlation signal is offset from zero Doppler frequency shift of said echo returns by one half the pulse repetition frequency of said transmitting means.

* * * * *